UNITED STATES PATENT OFFICE.

WILLIAM J. ARMBRUSTER, OF ST. LOUIS, MISSOURI.

PROCESS OF MAKING PIGMENTS.

SPECIFICATION forming part of Letters Patent No. 726,239, dated April 28, 1903.

Application filed July 26, 1902. Serial No. 117,186. (No specimens.)

*To all whom it may concern:*

Be it known that I, WILLIAM J. ARMBRUSTER, a citizen of the United States, residing at St. Louis, State of Missouri, have invented certain new and useful Improvements in Processes of Making Pigments, of which the following is a specification.

My invention has relation to improvements in processes of making pigments; and it consists in the novel series of steps more fully set forth in the specification and pointed out in the claims.

The composition in the present instance consists of an intimate mixture in molecular proportions of precipitated zinc hydrate (or oxid) and barium sulfate, and while a molecular compound precipitate of zinc hydrate and barium sulfate is not new the process, so far as I am aware, and the mechanical mixture of separately-precipitated zinc hydrate and barium sulfate are new. Broadly stated, the process contemplates the successive precipitation of zinc hydrate and barium sulfate from solutions of zinc salts (other than sulfate)— notably the chlorid, acetate, or nitrate—and soluble barium salts—notably the chlorid, acetate, or nitrate—the solution from which either precipitate is derived being formed either in the intermediate steps of the process or being an initial solution with which the process is started, and whether the solution is an initial one or an intermediate one it always serves as a reagent for purposes of precipitation by the addition thereto of the proper solution or salt capable of forming the precipitate at the moment of such addition.

As an illustration of the general principle here enunciated I prepare one molecular equivalent of an aqueous solution of zinc chlorid to which I add one equivalent of barium hydrate. The result of the mixture is a precipitate of one molecular equivalent of zinc hydrate and a solution of one equivalent of barium chlorid. To this solution is added one equivalent of a solution of zinc sulfate, when there is precipitated on top of the zinc hydrate one equivalent of barium sulfate, leaving a final or resulting solution of zinc chlorid to be used over again with a new addition of barium hydrate, and so on. The process is thus a continuous one. This condition may be expressed by the following reactions:

$$ZnCl_2 + Ba(OH)_2 = Zn(OH)_2 + BaCl_2$$
$$BaCl_2 + ZnSO_4 = BaSO_4 + ZnCl_2.$$

It is of course immaterial which solution is the initial one. If we start with barium chlorid, the reactions may be expressed as follows:

$$BaCl_2 + ZnSO_4 = BaSO_4 + ZnCl_2$$
$$ZnCl_2 + Ba(OH)_2 = Zn(OH)_2 + BaCl_2.$$

In either case there results the consecutive precipitation of zinc hydrate and barium sulfate, (or barium sulfate followed by zinc hydrate,) with the further result that the solution remaining after any precipitation is used for a subsequent precipitation, the solutions never passing out of the cycle of reagents employed in the process. The solutions may be either concentrated or normal, or the dry salt of one reagent may be added to a salt already in solution. In the event of normal solutions the excess of water resulting from consecutive additions in the repetition of the process may be evaporated by any means known to the art. So, too, should it be desirable to drive off the water of combination from the zinc hydrate, this may be done by proper heating, thus converting the hydrate to an oxid (ZnO) before combining and mixing it mechanically with the barium sulfate, or such conversion may even be effected after the precipitation of both, since the barium sulfate would undergo no change under the increased temperature.

If, as we may, we substitute the acetate of zinc for the chlorid, the reactions are as follows:

$$Zn(C_2H_3O_2)_2 + Ba(OH)_2 = Zn(OH)_2 + Ba(C_2H_3O_2)_2$$
$$Ba(C_2H_3O_2)_2 + ZnSO_4 = BaSO_4 + Zn(C_2H_3O_2)_2.$$

Where the nitrate of zinc is substituted for the chlorid, the reactions may be expressed as follows:

$$Zn(NO_3)_2 + Ba(OH)_2 = Zn(OH)_2 + Ba(NO_3)_2$$
$$Ba(NO_3)_2 + ZnSO_4 = BaSO_4 + Zn(NO_3)_2.$$

When the process is started with a barium acetate or nitrate, the reactions are respectively as follows:

$$Ba(C_2H_3O_2)_2 + ZnSO_4 = BaSO_4 + Zn(C_2H_3O_2)_2$$
$$Zn(C_2H_3O_2)_2 + Ba(OH)_2 = Zn(OH)_2 + Ba(C_2H_3O_2)_2$$

or $$Ba(NO_3)_2 + ZnSO_4 = BaSO_4 + Zn(NO_3)_2$$
$$Zn(NO_3)_2 + Ba(OH)_2 = Zn(OH)_2 + Ba(NO_3)_2.$$

So that in either event we obtain in succession precipitates of barium sulfate and zinc hydrate from solutions which remain permanently as reagents in the process.

The determination of the actual quantities of the materials used in the foregoing reactions is a simple stoicheiometric problem based upon the atomic weights of the elements constituting any molecule, and as a commercial illustration of the formula contained in the first of the above reactions the following may be cited: I prepare an aqueous solution of one hundred and thirty-five (135) pounds of zinc chlorid and one hundred and seventy-one (171) pounds of barium hydrate and bring them together, when there results a precipitate of ninety-nine (99) pounds of zinc hydrate and a solution containing two hundred and seven (207) pounds of barium chlorid. To this is added a solution containing one hundred and sixty-one (161) pounds of zinc sulfate, when there are precipitated two hundred and thirty-three (233) pounds of barium sulfate, leaving a final solution (corresponding to the initial one) containing one hundred and thirty-five (135) pounds of zinc chlorid. The process can thus be continued indefinitely.

My present process is not to be confounded with the prevailing method of forming a simultaneous compound precipitate of zinc hydrate and barium sulfate by the double decomposition and precipitation of zinc sulfate upon barium hydrate, thus $$ZnSO_4 + Ba(OH)_2 = Zn(OH)_2 + BaSO_4.$$

The barium sulfate thus precipitated direct from the hydrate is crystalline and is not as amorphous and has not the value as the precipitate derived from the more neutral chlorid of the same base. For the same reason a zinc hydrate precipitated from the chlorid has advantages over a zinc hydrate precipitated from a sulfate solution of zinc, whether acid or basic.

Invoking, as I may, the doctrine of chemical equivalents, it follows that I may substitute any of the oxids of barium for the barium hydrate without departing from the nature or spirit of my invention, and wherever in the claims the expression "chlorid" occurs it is to be understood that acetate or nitrate shall be equivalent thereto, and, further, that the converse of the steps recited in the claims shall be within the contemplation and scope of said claims.

Having described my invention, what I claim is—

1. In the manufacture of pigments, the process of adding barium hydrate to a soluble salt of zinc other than the sulfate, then adding sulfate of zinc, and recovering the resulting precipitates, substantially as set forth.

2. In the manufacture of pigments, the process of adding barium hydrate to zinc chlorid, then adding sulfate of zinc, and recovering the resulting precipitates, substantially as set forth.

3. In the manufacture of pigments, the process of adding barium hydrate to a soluble salt of zinc other than the sulfate, then adding sulfate of zinc, and recovering the resulting precipitates of zinc hydrate and barium sulfate and finally converting the hydrate of zinc into an oxid of zinc by heat, substantially as set forth.

4. In the manufacture of pigments, the process of adding to one molecular equivalent of a solution of zinc chlorid, one molecular equivalent of barium hydrate, then adding a corresponding molecular equivalent of zinc sulfate, and recovering the resulting precipitates, substantially as set forth.

5. In the manufacture of pigments, the process of adding to one molecular equivalent of a solution of a salt of zinc other than the sulfate, one molecular equivalent of barium hydrate, then adding one molecular equivalent of zinc sulfate, and recovering the resulting precipitates, substantially as set forth.

In testimony whereof I affix my signature in presence of two witnesses.

WILLIAM J. ARMBRUSTER.

Witnesses:
EMIL STAREK,
G. L. BELFRY.